(12) United States Patent
Kato et al.

(10) Patent No.: US 6,224,034 B1
(45) Date of Patent: May 1, 2001

(54) CONTROL VALVE DEVICE (75) Inventors: Yasuhiko Kato; Toshihiko Miyake; Sotsuo Miyoshi; Hidetoshi Okada, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/403,401

(22) PCT Filed: Feb. 23, 1998

(86) PCT No.: PCT/JP98/00720

§ 371 Date: Dec. 13, 1999

§ 102(e) Date: Dec. 13, 1999

(87) PCT Pub. No.: WO99/43072

PCT Pub. Date: Aug. 26, 1999

(51) Int. Cl.⁷ .............................. F20B 47/08; F16K 31/02
(52) U.S. Cl. ............... 251/164; 251/124.11; 251/129.12; 251/124.13; 123/568.23
(58) Field of Search .................. 251/64, 129.11, 251/129.12, 129.13; 123/568.23, 568.24

(56) References Cited

U.S. PATENT DOCUMENTS

| | | | |
|---|---|---|---|
| 3,700,085 | * 10/1972 | Balz | 251/134 |
| 4,480,614 | * 11/1984 | Kobashi et al. | 123/339 |
| 5,351,935 | 10/1994 | Miyoshi et al. . | |
| 5,370,355 | * 12/1994 | Rembold et al. | 251/64 |
| 5,377,952 | * 1/1995 | Schabert et al. | 251/129.13 |
| 5,427,352 | * 6/1995 | Brehm | 251/64 |
| 5,501,201 | 3/1996 | Miyoshi et al. . | |
| 5,680,880 | 10/1997 | Miyake et al. . | |
| 5,718,259 | 2/1998 | Miyake et al. . | |

FOREIGN PATENT DOCUMENTS

| | | | |
|---|---|---|---|
| 0001486 | * 1/1985 | (JP) | 251/64 |
| 60-093474 | 6/1985 | (JP) . | |
| 7-27023 | 1/1995 | (JP) . | |
| 3014309 | 5/1995 | (JP) . | |
| 7-27266 | 5/1995 | (JP) . | |
| 7-27288 | 5/1995 | (JP) . | |
| 7-250465 | 9/1995 | (JP) . | |
| 7-332168 | 12/1995 | (JP) . | |
| 8-44432 | 2/1996 | (JP) . | |
| 8-163856 | 6/1996 | (JP) . | |
| 63-187575 | 12/1998 | (JP) . | |

* cited by examiner

*Primary Examiner*—Kevin Shaver
*Assistant Examiner*—D. A. Bonderer
(74) *Attorney, Agent, or Firm*—Sughrue, Mion, Zinn, Macpeak & Seas, PLLC (57) ABSTRACT

An elastic body 51 is provided to absorb impact energy generated by the collision between rotor positioning portions 31 and shaft portion positioning portions 29 when a shaft portion 24 is moved into a female thread portion 26 to determine the initial position of the shaft portion 24, and so the impact noise generated by the collision between the rotor positioning portions 31 and the shaft portion positioning portions 29 can be reduced. Also, the force of impact imparted to the shaft portion positioning portions 29 by the rotor positioning portions 31 decreases, and so it is possible to prevent deformation of the rotor positioning portions 31 and the shaft portion positioning portions 29.

8 Claims, 10 Drawing Sheets

CONTROL VALVE DEVICE

TECHNICAL FIELD

The present invention relates to a control valve device which opens and closes a valve by driving a stepper motor.

BACKGROUND ART

Figure 12:
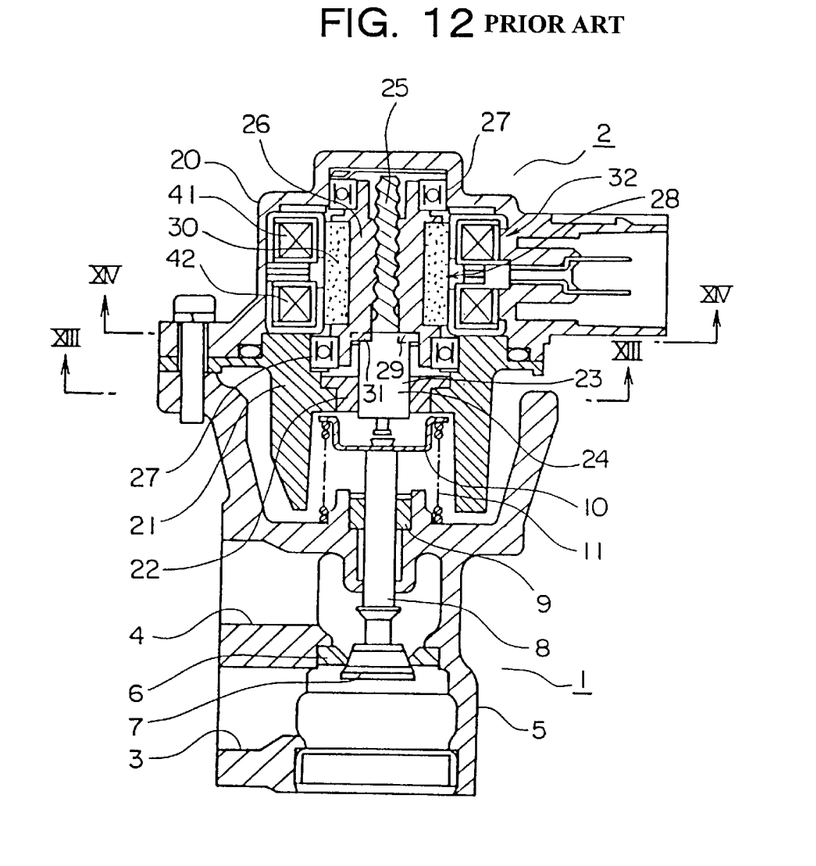
FIG. 12 is a cross section of a conventional exhaust gas recirculation control valve device.
Figure 13:
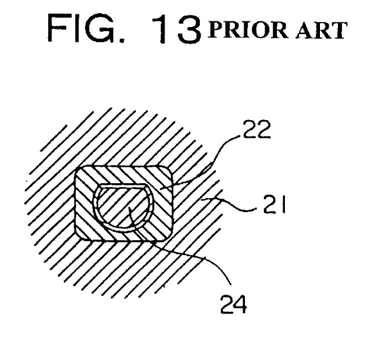
FIG. 13 is a cross section along line XIII—XIII of FIG. 12.
Figure 14:
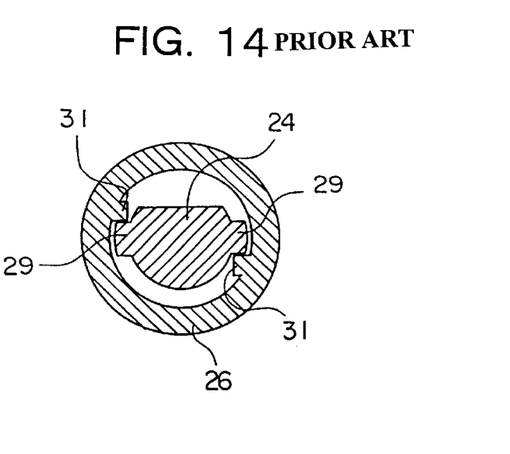
FIG. 14 is a cross section along line XIV—XIV of FIG. 12.
Figure 15:
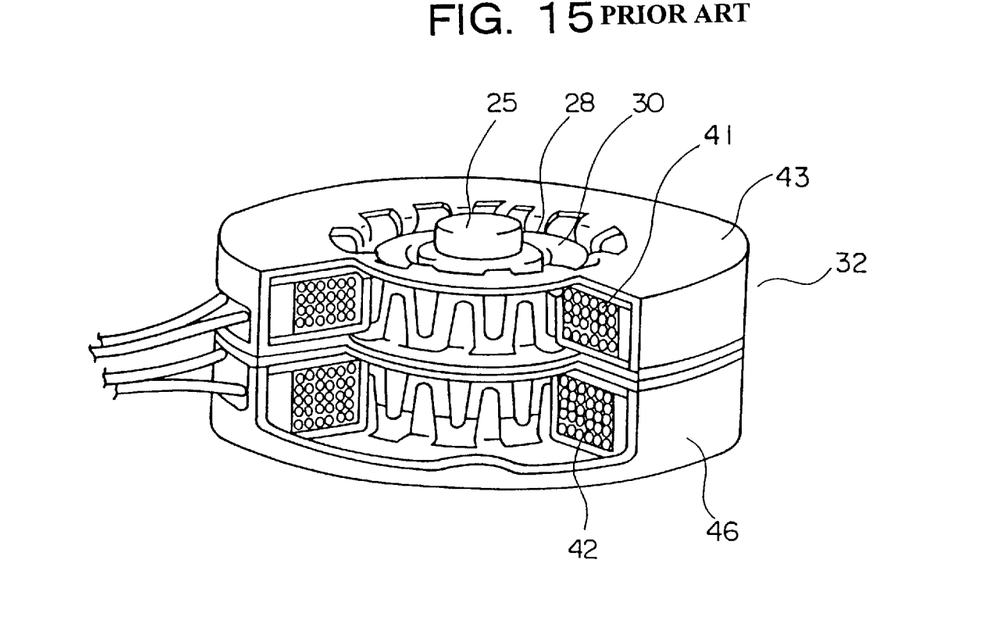
FIG. 15 is a cut away perspective view of part of the essential part of the exhaust gas recirculation control valve device of FIG. 10.
Figure 16:
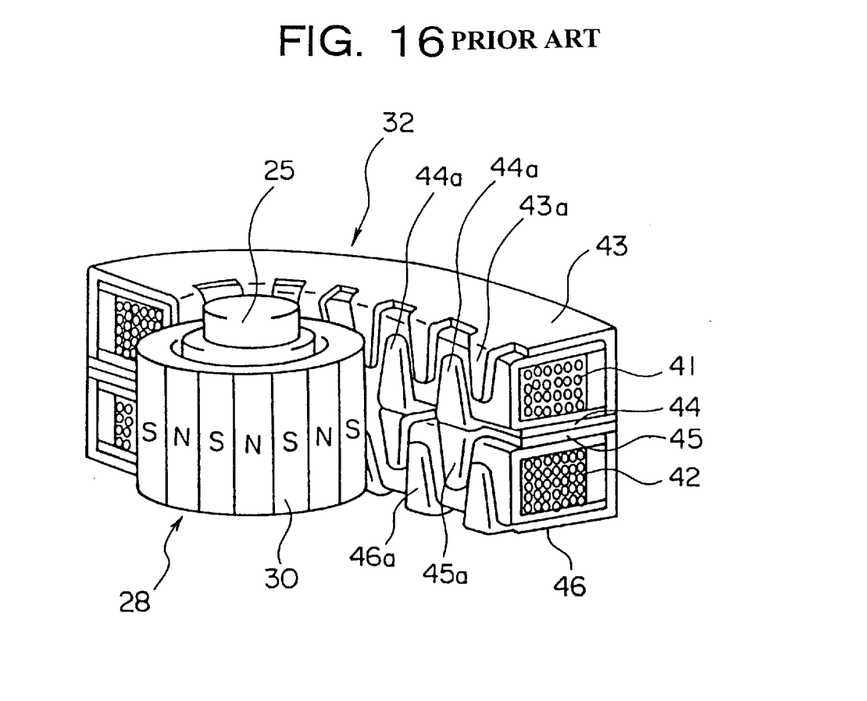
FIG. 16 is a schematic of the essential part of the exhaust gas recirculation control valve device of FIG. 12.

FIG. 12 is a cross section of a conventional exhaust gas recirculation control valve device (hereinafter simply "EGR valve"), FIG. 13 is a cross section along line XIII—XIII of FIG. 12, FIG. 14 is a cross section along line XIV—XIV of FIG. 12, FIG. 15 is a cut away perspective view of part of the stepper motor in FIG. 12, and FIG. 16 is a schematic of the interior of the stepper motor in FIG. 15. Further, FIG. 14 is expanded to twice the size of FIG. 13.

This EGR valve is provided with a valve main body 1 and a stepper motor 2 mounted on the upper portion of the valve main body 1.

The valve main body 1 is provided with a valve body 5 having an exhaust gas inflow passage 3 and an exhaust gas outflow passage 4, a valve seat 6 disposed between the exhaust gas inflow passage 3 and the exhaust gas outflow passage 4, a valve 7 in direct contact with the valve seat 6, a valve shaft 8, one end of which is fixed to the valve 7, a shaft bushing 9 disposed between the valve body 5 and the valve shaft 8 so as to slidably support the valve shaft 8, a spring bracket 10 fixed to the other end of the valve shaft 8, and a coil spring 11 compressed and disposed between the valve body 5 and the spring bracket 10.

The stepper motor 2 is provided with a motor case 20, a motor cap 21 fixed to the motor case 20, a rotor 28 disposed within the motor case 20 and rotatably supported by a shaft bushing 27, and a stator 32 disposed on the outside of the rotor 28 to turn the rotor 28.

The rotor 28 is provided with a shaft bushing 22 fixed to the motor cap 21, a motor shaft 23 having a shaft portion 24 supported by the shaft bushing 22 so as to slide freely along the direction of the shaft and a male thread portion 25, a female thread portion 26 screwing the male thread portion 25, and a cylindrical magnet portion 30 consisting of an array of alternating north pole magnets and south pole magnets disposed outside the female thread portion 26.

As shown in FIG. 13, the cross section of the shaft portion 24 of the motor shaft 23 is a segmented circle, so that the motor shaft 23 can only move along the direction of the shaft axis. Also, as shown in FIG. 14, protruding shaft portion positioning portions 29 are formed in the upper portion of the shaft portion 24. A pair of rotor positioning portions 31, which come into direct contact with the shaft portion positioning portions 29, are formed on the inner surface of the lower portion of the female thread portion 26. The upper positional limit of the motor shaft 23 is regulated by the rotor positioning portions 31 coming into contact with the shaft portion positioning portions 29. In other words, as the female thread portion 26 rotates, the motor shaft 23, which has a thread screwing that of the female thread portion 26, may move upwards, but once the rotor positioning portions 31 come into contact with the shaft portion positioning portions 29, the female thread portion 26 can no longer rotate, and so the motor shaft 23 cannot move upwards any further (the motor shaft 23 cannot rotate; it can only move along the direction of the shaft axis because of the shaft bushing 22).

The aforementioned stator 32 is provided with an upper coil 41, a lower coil 42 disposed below the upper coil 41, a first phase stator portion 43 mounted on the upper surface of the upper coil 41, a second phase stator portion 44 mounted on the lower surface of the upper coil 41, a third phase stator portion 45 mounted on the upper surface of the lower coil 42, and a fourth phase stator portion 46 mounted on the lower surface of the lower coil 42. The shape of each of the phase stator portions 43, 44, 45, 46 is annular, and each has claw portions 43a, 44a, 45a, 46a formed on its inner edge and bent towards coils 41 and 42, respectively. The claw portions 43a of the first phase stator portion 43 are arranged so as to interlock with the claw portions 44a of the second phase stator portion 44, and the claw portions 45a of the third phase stator portion 45 are arranged so as to interlock with the claw portions 46a of the fourth phase stator portion 46.

In the above EGR valve, when a current is passed through the upper coil 41 and the lower coil 42, magnetic poles is formed in each phase of the stator portions 43, 44, 45, 46 and like magnetic poles is formed in the corresponding claw portions 43a, 44a, 45a, 46a.

The direction of the current in the upper coil 41 can be reversed, and similarly the direction of the current in the lower coil 42 can also be reversed, so that there are four possible patterns of current direction and the magnetic poles which arise in each of the phase stator portions 43, 44, 45, 46 change with each pattern. Then, within the magnetic field generated by the claw portions 43a, 44a, 45a, 46a, the magnet portion 30 and the female thread portion 26 rotate to and are maintained in a position where the magnetic forces acting on between the claw portions 43a, 44a, 45a, 46a and the magnet portion 30 are in equilibrium.

Also, if the order of the above changes in current pattern (steps) is reversed, the magnetic portion 30 and the female thread portion 26 will rotate in the opposite direction.

With the rotation of the magnetic portion 30 and the female thread portion 26, the male thread portion 25, whose thread matches that of the female thread portion 26, also rotates and motor shaft 23 moves along the direction of the shaft axis.

In the aforementioned EGR valve, when the motor shaft 23 is moved downwards by the action of the aforementioned stepper motor, the motor shaft 23 starts to act midway in opposition to the elasticity of the compressed coil spring 11, pushing the head of the valve shaft 8 and moving the valve shaft 8 downwards and thus separating the valve 7 from the valve seat 6, whereby the exhaust gas inflow passage 3 connects with the exhaust gas outflow passage 4 and exhaust gas flows from the exhaust gas inflow passage 3 into the exhaust gas outflow passage 4.

By reversing the direction of rotation of the magnetic portion 30 and the female thread portion 26, the motor shaft 23 will move upwards along the direction of the shaft axis and the valve shaft 8 will also be moved upwards by the elasticity of the compressed coil spring 11, its head in contact with the shaft portion 24. Then, the valve 7 will come into contact with the valve seat 6, closing the valve main body 1, whereby the exhaust gas inflow passage 3 is cut off from the exhaust gas outflow passage 4 and exhaust gas cannot flow. If the magnetic portion 30 and the female thread portion 26 are rotated further in this direction, the motor shaft 23 will move further upwards and the shaft portion 24 will separate from the valve shaft 8.

Figure 17:
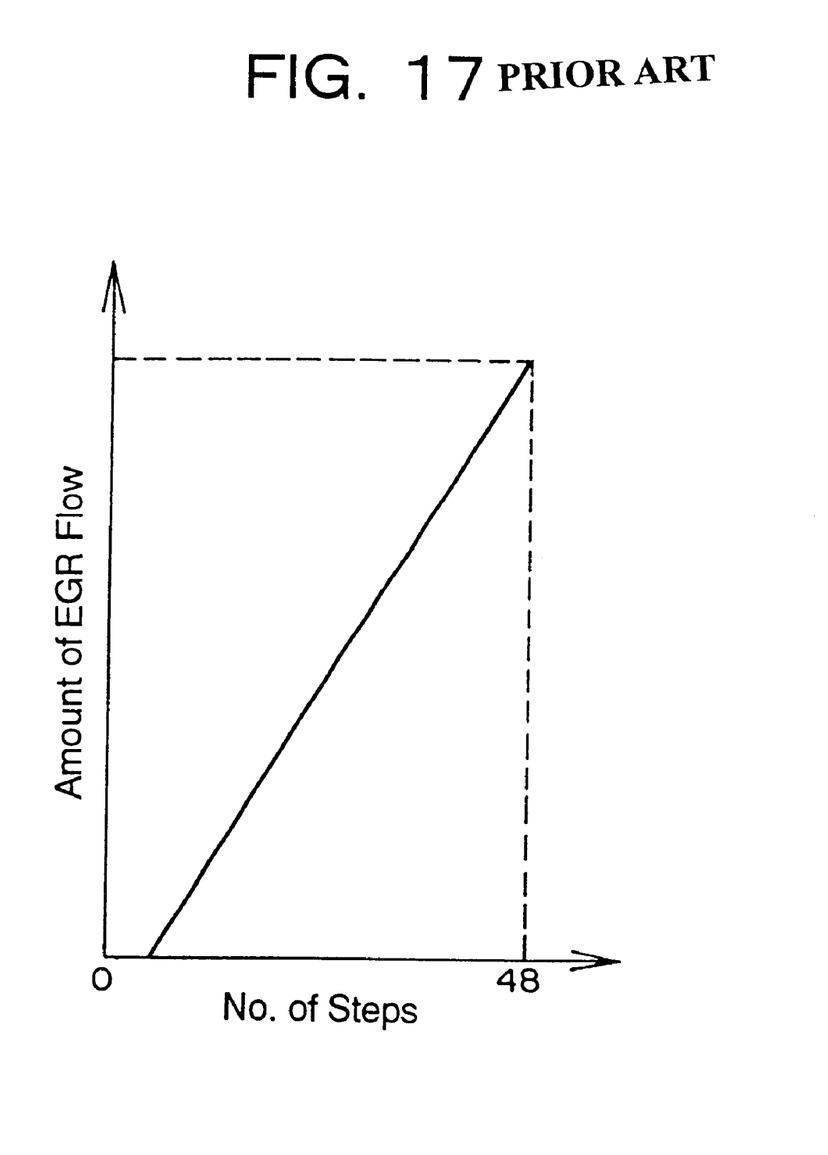
FIG. 17 is a graph showing the relationship between the number of steps and the amount of flow in the exhaust gas recirculation control valve device.

FIG. 17 shows the relationship between the number of steps (number of changes in current pattern) in the stepper motor 2 and the amount of flow through the EGR valve. It can be seen from the graph that the amount of flow is proportional to the number of steps.

Now, in order to operate the stepper motor 2 exactly as instructed by the control unit (not shown), it is necessary to initialize the position of the motor shaft 23 of the stepper motor 2 beforehand.

To perform this initialization reliably, the stepper motor 2 is given a greater number of steps than is needed to place the motor shaft 23 of the stepper motor 2 at the end of the motor. In this way, the shaft portion 24 of the motor shaft 23 is separated to an appointed distance from the head of the valve shaft 8, and once the motor shaft 23 reaches the motor end position, even if current is passed through the upper coil 41 and lower coil 42, generating magnetic poles in each of the phase stator portions 43, 44, 45, 46 and rotating the magnetic portion 30 and the female thread portion 26 in an attempt to move the motor shaft 23 upwards, the rotor positioning portions 31 will come into contact with the shaft portion positioning portions 29 of the shaft portion 24 and the magnetic portion 30 and the female thread portion 26 will not be able to rotate further, and so, once the motor shaft 23 reaches the motor end position, it does not move any further into the female thread portion 26.

Figure 18:
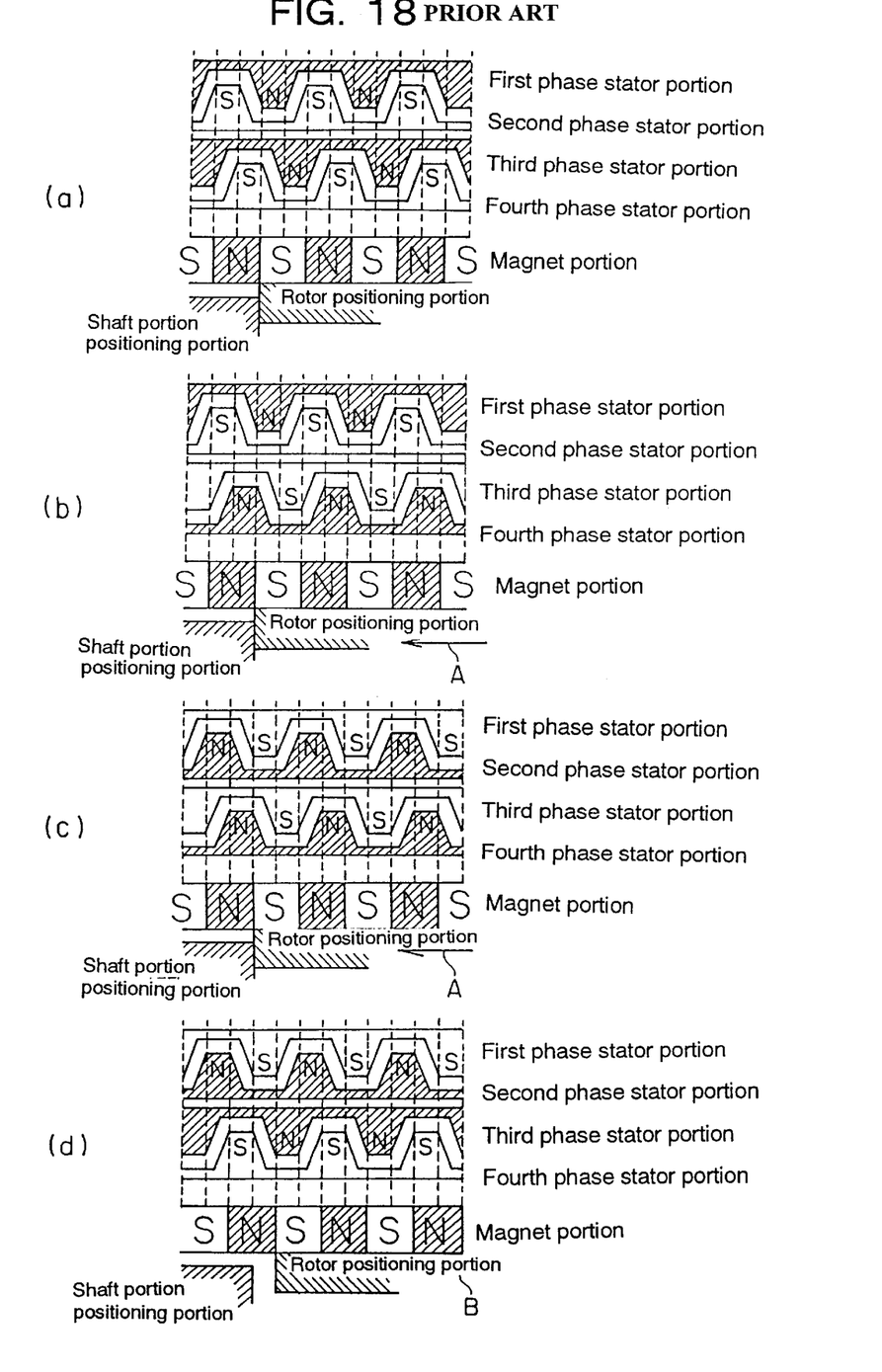
FIGS. 18(a) to (d) are diagrams showing the relationship between the magnetization of each of the stator portions and the position of the magnet portion during the process of initialization of the stepper motor.

Next, the motion of the magnet portion 30 after the motor shaft 23 has reached the motor end shall be explained on the basis of FIG. 18.

FIGS. 18(a) to (d) show the changes in the magnetization of each of the stator portions 43, 44, 45, 46 when the motor shaft 23 is moved into the female thread portion 26. The magnetization of each of the stator portions 43, 44, 45, 46 changes in the order of FIG. 18(a), FIG. 18(b), FIG. 18(c), and FIG. 18(d), and after FIG. 18(d), it returns to that of FIG. 18(a).

FIG. 18(a) shows the magnetization of each of the stator portions 43, 44, 45, 46 and the position of the magnet portion 30 at the instant the motor shaft 23 reaches the motor end.

FIG. 18(b) shows the magnetization of each of the stator portions 43, 44, 45, 46 intended to apply a single step of rotational force to the magnet portion 30 in the direction of the arrow A. The force acts on the magnet portion 30 in the direction of the arrow A, but the rotor positioning portions 31 come into contact with the shaft portion positioning portions 29 and the magnet portion 30 cannot rotate.

FIG. 18(c) shows the magnetization of each of the stator portions 43, 44, 45, 46 intended to apply a further single step of rotational force to the magnet portion 30 in the direction of the arrow A. The force acts further on the magnet portion 30 in the direction of A, but the rotor positioning portions 31 come into contact with the shaft portion positioning portions 29 and the magnet portion 30 cannot rotate.

FIG. 18(d) shows the magnetization of each of the stator portions 43, 44, 45, 46 intended to apply a further single step of rotational force to the magnet portion 30 in the direction of the arrow A. However, from this position, the magnetic forces acting between the stator portions 43, 44, 45, 46 and the magnet portion 30 rotate the magnet portion 30 and stabilize one step in the direction of arrow B.

When the stepper motor is again magnetized to turn the rotor 28 one step in the direction of the arrow A, the magnetization of each of the stator portions 43, 44, 45, 46 and the position of magnet portion 30 is as shown in FIG. 18(a), and the magnet portion 30 moves in the direction to collide with the shaft portion positioning portions 29. Thereafter, the above operation is repeated as part of the process of initialization, and on completion of initialization, the magnetization of the stator portions 43, 44, 45, 46 is as shown in FIG. 18(a) and the motor shaft 23 is positioned at the motor end.

The conventional EGR valve is constructed as described above and during the process of initialization, when the magnet portion 30 moves from the position shown in FIG. 18(d) to that shown in FIG. 18(a), the rotor positioning portions 31 of the female thread portion 26, which move synchronously with the magnet portion 30, collide with the shaft portion positioning portions 29 and generate sound.

In particular, because the initialization of the stepper motor 2 is performed at quiet times immediately after the internal combustion engine has been switched off or just before the engine is started again, the noise of the impact can be heard by the driver in the car.

The present invention aims to solve such problems and its objective is to provide a control device to reduce the volume of the impact noise generated when the rotor positioning portions collide with the shaft portion positioning portions during the process of initialization.

DISCLOSURE OF INVENTION

The control valve device according to claim 1 of the present invention is provided with a valve main body having a valve body having an inflow passage and an outflow passage, a valve seat disposed between the inflow passage and the outflow passage, a valve in direct contact with the valve seat, a valve shaft, one end of which is fixed to the valve, and a pushing means for pushing the valve against the valve seat, and a stepper motor for pushing the valve shaft in opposition to the pushing force of the pushing means, wherein the stepper motor includes:

a rotor having a shaft portion having a shaft portion positioning portion which comes into contact with and pushes the valve shaft and also separates therefrom, a male thread portion connected to the shaft portion, a shaft bushing supporting the shaft portion so as to permit it to move only along the direction of the shaft axis, a female thread portion screwing the male thread portion which moves the male thread portion and the shaft portion along the direction of the shaft axis by rotating, a magnet portion consisting of an array of alternating north pole magnets and south pole magnets disposed around the female thread portion which rotates with the female thread portion, a rotor positioning portion which comes into direct contact with the shaft portion positioning portion and stops the rotation of the female thread portion and the magnet portion and an elastic body which absorbs the impact energy released by the collision of the rotor positioning portion with the shaft portion positioning portion when the shaft portion is moved into the female thread portion to determine the initial position of the shaft portion; and a stator disposed around the outside of the rotor, which rotates the magnet portion and the female thread portion in steps by the interaction of magnetic forces between the magnet portion and a field of north and south magnetic poles generated by passing a current through the stator.

In the control valve device according to claim 2, the elastic body is disposed between the shaft bushing and the motor cap surrounding the shaft portion.

In the control valve device according to claim 3, the elastic body is integrated into the shaft bushing.

In the control valve device according to claim 4, the elastic body is disposed between the rotor positioning portion and the shaft portion positioning portion.

In the control valve device according to claim 5, the elastic body is disposed between the shaft portion and the male thread portion.

In the control valve device according to claim 6, the elastic body is disposed between the magnet portion and the female thread portion.

In the control valve device according to claim 7, the pushing means is a coil spring.

In the control valve device according to claim 8, the valve main body is an exhaust gas recirculation control valve.

BEST MODE FOR CARRYING OUT THE INVENTION

Embodiment 1

Figure 1:
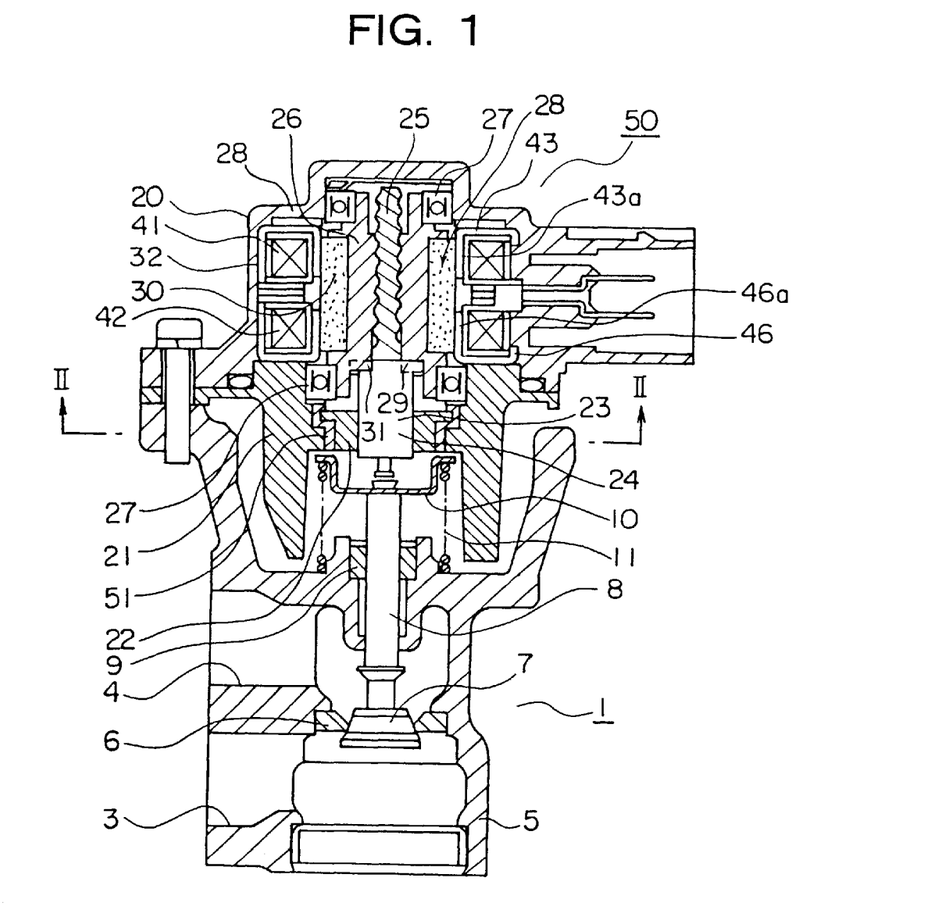
FIG. 1 is a cross section of the exhaust gas recirculation control valve device according to Embodiment 1 of the present invention.
Figure 2:
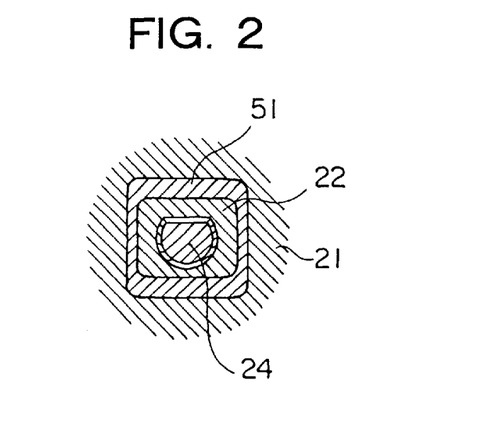
FIG. 2 is a cross section along line II—II of FIG. 1.

FIG. 1 is a cross section of the exhaust gas recirculation control valve device (hereinafter simply "EGR valve") according to Embodiment 1 of the present invention and FIG. 2 is a cross section along line II—II of FIG. 1.

This EGR valve is provided with a valve main body 1 and a stepper motor 50 mounted on the upper portion of the valve main body 1.

The valve main body 1 is provided with a valve body 5 having an exhaust gas inflow passage 3 and an exhaust gas outflow passage 4, a valve seat 6 disposed between the exhaust gas inflow passage 3 and the exhaust gas outflow passage 4, a valve 7 in direct contact with the valve seat 6, a valve shaft 8, one end of which is fixed to the valve 7, a shaft bushing 9 disposed between the valve body 5 and the valve shaft 8 so as to slidably support of the valve shaft 8, a spring bracket 10 fixed to the other end of the valve shaft 8, and a coil spring 11 compressed and disposed between the valve body 5 and the spring bracket 10.

The stepper motor 50 is provided with a motor case 20, a motor cap 21 fixed to the motor case 20, a rotor 28 disposed within the motor case 20 and rotatably supported by a shaft bushing 27, and a stator 32 disposed on the outside of the rotor 28 to turn the rotor 28.

The rotor 28 is provided with a shaft bushing 22 fixed to the motor cap 21, a motor shaft 23 having a shaft portion 24 supported by the shaft bushing 22 so as to slide freely along the direction of the shaft and a male thread portion 25, an elastic body 51 disposed between the shaft bushing 22 and the motor cap 21, a female thread portion 26 screwing the male thread portion 25, and a cylindrically shaped magnet portion 30 consisting of an array of alternating north pole magnets and south pole magnets disposed outside the female thread portion 26.

As shown in FIG. 2, the cross section of the shaft portion 24 of the motor shaft 23 is a segmented circle, so that the motor shaft 23 can only move along the direction of the shaft axis. Also, protruding shaft portion positioning portions 29 are formed in the upper portion of the shaft portion 24 like those shown in FIG. 14 and a pair of rotor positioning portions 31 like those shown in FIG. 14 are formed on the inner surface of the lower portion of the female thread portion 26. The upper positional limit of the motor shaft 23 is regulated by the rotor positioning portions 31 coming into contact with the shaft portion positioning portions 29. In other words, as the female thread portion 26 rotates, the motor shaft 23, which has a thread screwing that of the female thread portion 26, may move upwards, but once the rotor positioning portions 31 come into contact with the shaft portion positioning portions 29, the female thread portion 26 can no longer rotate, and so the motor shaft 23 cannot move upwards any further (the motor shaft 23 cannot rotate; it can only move along the direction of the shaft axis because of the shaft bushing 22).

The aforementioned stator 32 is provided with an upper coil 41, a lower coil 42 disposed below the upper coil 41, a first phase stator portion 43 mounted on the upper surface of the upper coil 41, a second phase stator portion (not shown) mounted on the lower surface of the upper coil 41, a third phase stator portion (not shown) mounted on the upper surface of the lower coil 42, and a fourth phase stator portion 46 mounted on the lower surface of the lower coil 42. The shape of each of the phase stator portions 43, 46 is annular, and each has claw portions 43a, 46a formed on its inner edge and bent around the inner surface of coils 41 and 42, respectively. The claw portions 43a of the first phase stator portion 43 are arranged so as to interlock with the claw portions of the second phase stator portion, and the claw portions of the third phase stator portion are arranged so as to interlock with the claw portions 46a of the fourth phase stator portion 46.

Further, the tubular elastic body 51 is composed of fluororubber with a rubber hardness of 80 degrees, but a coil spring may also be used as an elastic body.

In the above EGR valve, when the stepper motor 50 is to be operated by instructions from a control unit (not shown), it is necessary to initialize the stepper motor 50 beforehand. During this initialization process, the rotor positioning portions 31 on the inner surface of the lower portion of the female thread portion 26 repeatedly collide with the shaft portion positioning portions 29. Whereas in conventional constructions the shaft bushing 22 is fixed to the motor cap 21 as can be seen from FIG. 12, in this embodiment the elastic body 51 is interposed between the shaft bushing 22 and the motor cap 21. Thus, when the rotor positioning portions 31 collide with the shaft portion positioning portions 29, a portion of the impact energy is absorbed as elastic deformation of the elastic body 51 and the volume of the impact noise generated is that much smaller. Also, when the impact noise propagates in the direction of the motor cap 21, it is absorbed by the elastic body 51 midway and the volume of the impact noise is further reduced.

Also, because a portion of the impact energy is absorbed by elastic deformation of the elastic body 51, the force of impact imparted to the shaft portion positioning portions 29 by the rotor positioning portions 31 is decreased and deformation of the rotor positioning portions 31 and the shaft portion positioning portions 29 due to impact can be prevented.

Embodiment 2

Figure 3:
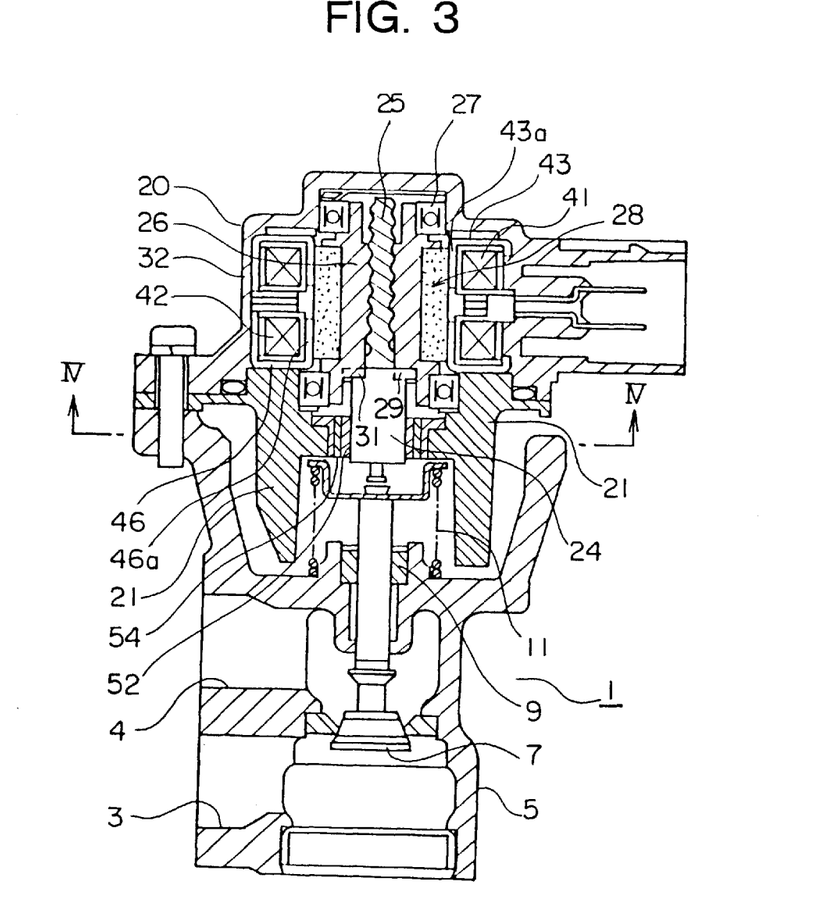
FIG. 3 is a cross section of the exhaust gas recirculation control valve device according to Embodiment 2 of the present invention.
Figure 4:
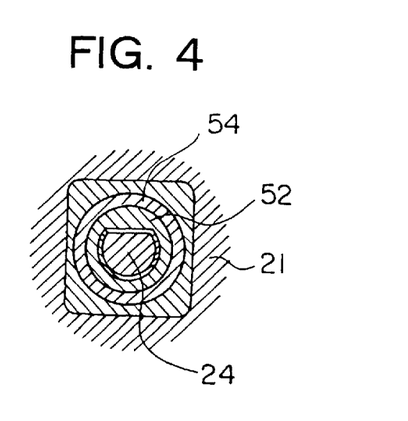
FIG. 4 is a cross section along line IV—IV of FIG. 3.

FIG. 3 is a cross section of the EGR valve according to Embodiment 2 of the present invention and FIG. 4 is a cross section along line IV—IV of FIG. 3.

This embodiment differs from Embodiment 1 in that a cylindrical elastic body 54 is integrated into a shaft bushing 52. Further, the elastic body 54 is composed of fluororubber with a rubber hardness of 80 degrees.

In this embodiment also, when the rotor positioning portions 31 collide with the shaft portion positioning portions 29, a portion of the impact energy is absorbed by elastic deformation of the elastic body 54 and the volume of the impact noise is that much smaller. Also, when the impact noise propagates in the direction of the motor cap 21, it is absorbed by the elastic body 54 and the volume of the impact noise is further reduced.

Also, because a portion of the impact energy is absorbed by elastic deformation of the elastic body 54, the force of impact imparted to the shaft portion positioning portions 29 by the rotor positioning portions 31 is decreased and deformation of the rotor positioning portions and the shaft portion positioning portions due to impact can be prevented.

Embodiment 3

Figure 5:
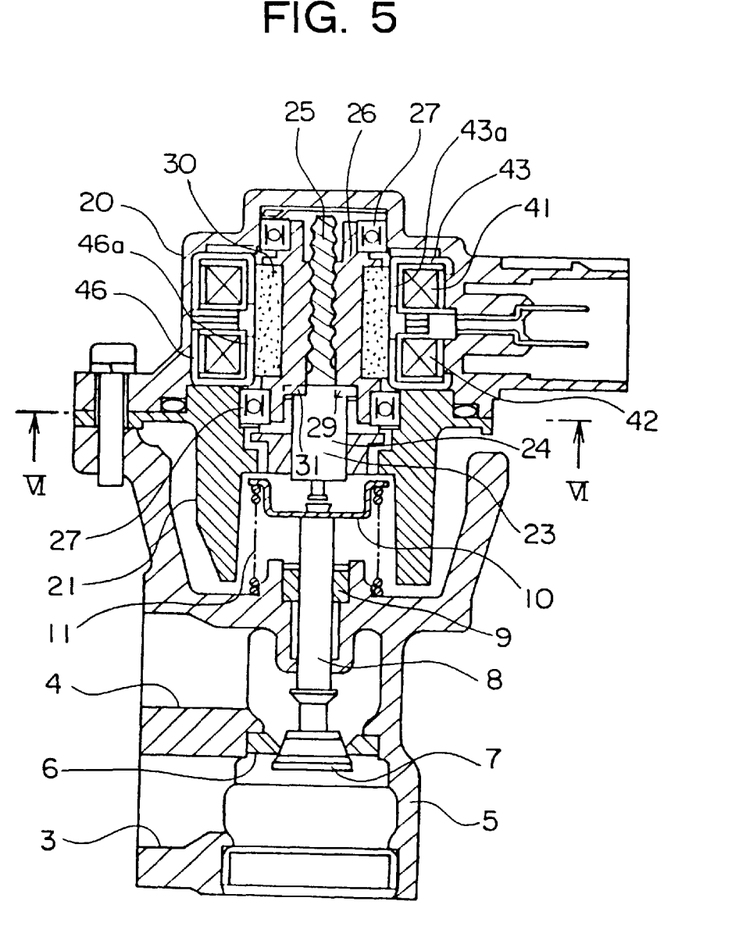
FIG. 5 is a cross section of the exhaust gas recirculation control valve device according to Embodiment 3 of the present invention.
Figure 6:
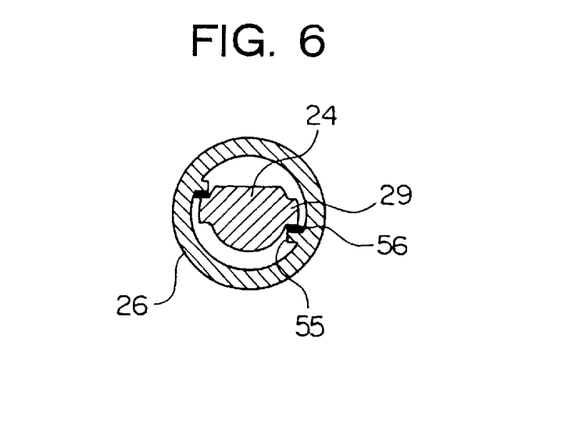
FIG. 6 is a cross section along line VI—VI of FIG. 5.
Figure 7:
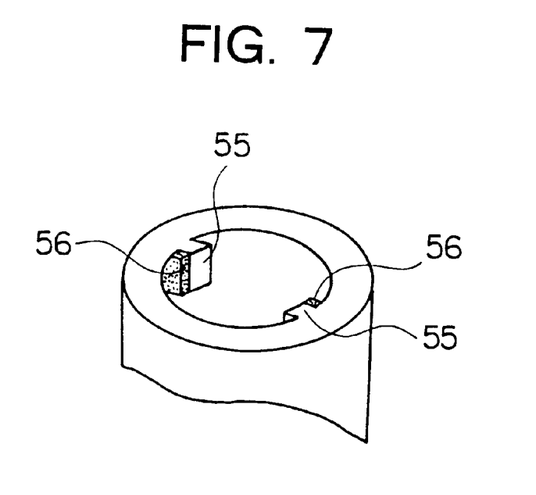
FIG. 7 is an perspective view of the rotor positioning portions shown in FIG. 6.

FIG. 5 is a cross section of the EGR valve according to Embodiment 3 of the present invention, FIG. 6 is a cross section along line VI—VI of FIG. 5, and FIG. 7 is an perspective view of the rotor positioning portions shown in FIG. 6.

In this embodiment, elastic bodies 56 are fixed to rotor positioning portions 55. The elastic bodies 56 are composed of fluororubber with a rubber hardness of 80 degrees with a surface coating of polytetrafluoroethylene resin (trademark name Teflon). The rest of the construction is identical to the conventional construction shown in FIG. 12.

In this embodiment also, when the rotor positioning portions 55 collide with the shaft portion positioning portions 29, a portion of the impact energy is directly absorbed by elastic deformation of the elastic bodies 56 and the volume of the impact noise is that much smaller. Further, in this embodiment, because the rotor positioning portions 55 collide with the shaft portion positioning portions 29 through the elastic bodies 56 and much of the impact energy imparted to the shaft portion positioning portions 29 by the rotor positioning portions 55 is consumed by elastic deformation of the elastic bodies 56, the impact noise generated by the collision is even less than that of Embodiments 1 and 2.

Further, the elastic bodies 56 may be fixed to the shaft portion positioning portions 29. Also, because the elastic bodies 56 receive stronger impacts than those of Embodiments 1 and 2, materials with greater resistance to impact have been used.

Embodiment 4

Figure 8:
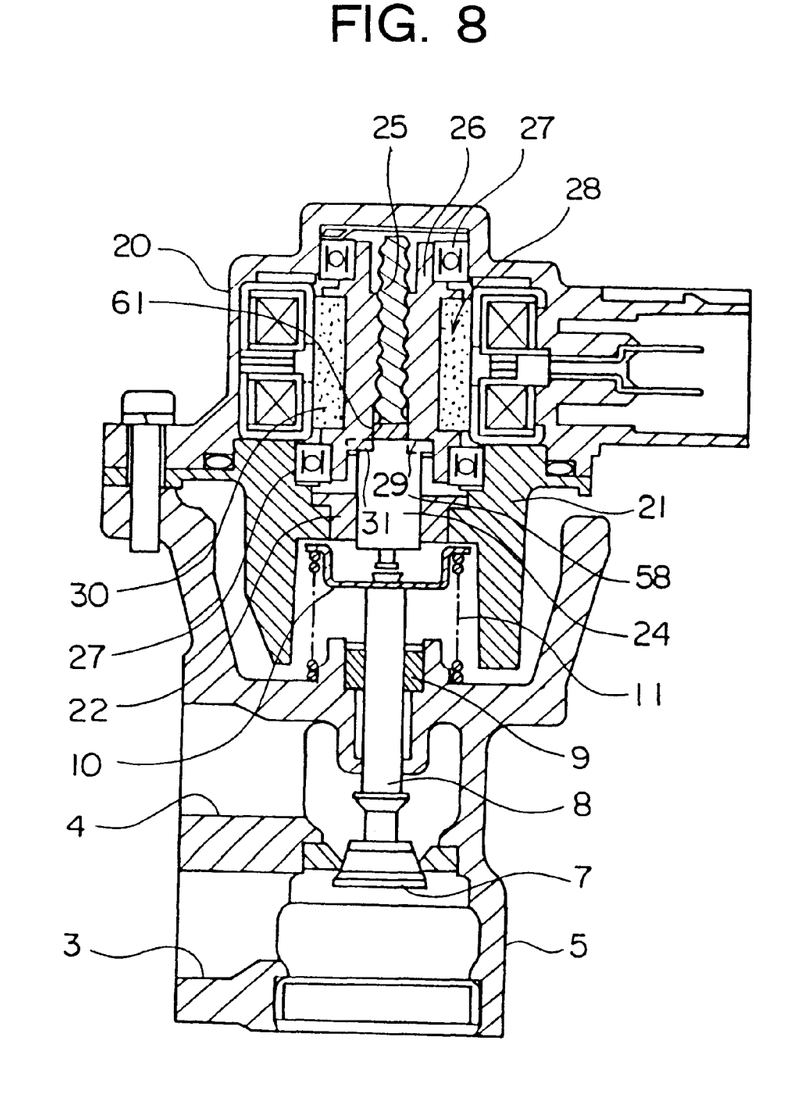
FIG. 8 is a cross section of the exhaust gas recirculation control valve device according to Embodiment 4 of the present invention.
Figure 9:
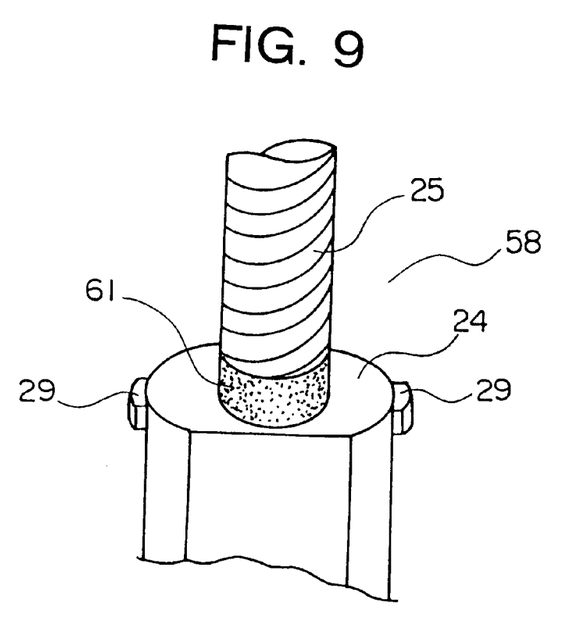
FIG. 9 is an perspective view of a portion of the motor shaft of FIG. 8.

FIG. 8 is a cross section of the EGR valve according to Embodiment 4 of the present invention, and FIG. 9 is an perspective view of a portion of the motor shaft 58 of FIG. 8.

In this embodiment, an elastic body 61 is interposed between the shaft portion 24 and the male thread portion 25 of the motor shaft 58. Elastic body 61 is composed of fluororubber with a rubber hardness of 80 degrees. The rest of the construction is identical to the conventional construction shown in FIG. 12.

In this embodiment also, when the rotor positioning portions 31 collide with the shaft portion positioning portions 29, a portion of the impact energy is absorbed by elastic deformation of the elastic body 61 and the volume of the impact noise is that much smaller. Further, a coil spring may also be used as the elastic body.

Embodiment 5

Figure 10:
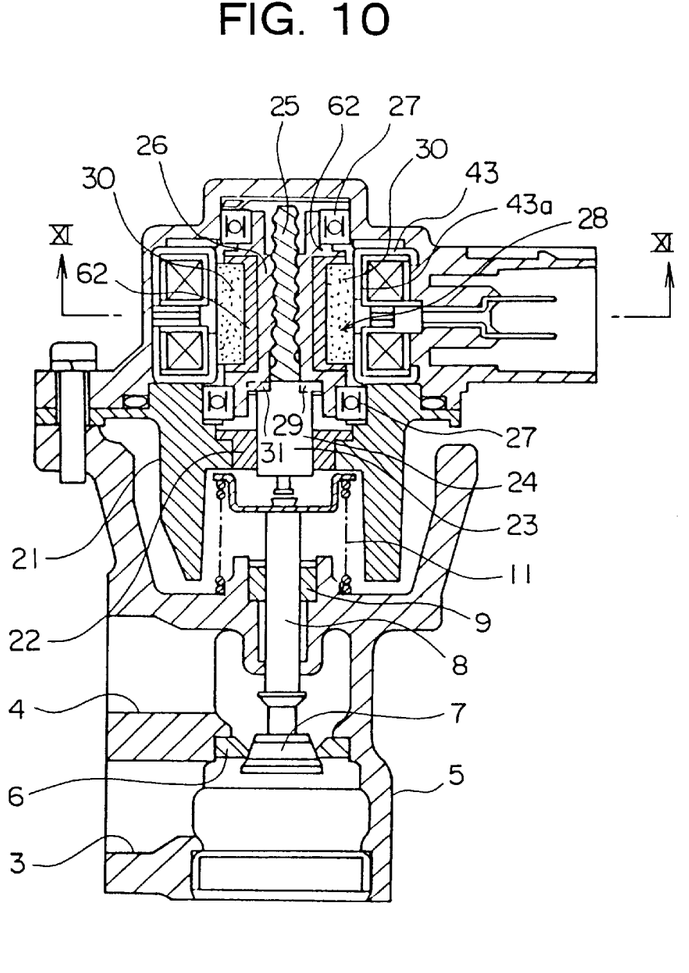
FIG. 10 is a cross section of the exhaust gas recirculation control valve device according to Embodiment 5 of the present invention.
Figure 11:
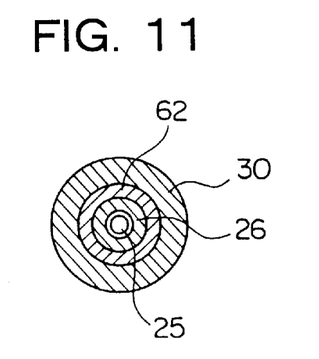
FIG. 11 is a cross section along line XI—XI of FIG. 10.

FIG. 10 is a cross section of the EGR valve according to Embodiment 5 of the present invention, and FIG. 11 is a cross section along line XI—XI of FIG. 10.

This embodiment differs from Embodiment 1 in that an elastic body 62 composed of fluororubber with a rubber hardness of 80 degrees is disposed between the magnet portion 30 and the female thread portion 26.

In this embodiment also, when the rotor positioning portions 31 collide with the shaft portion positioning portions 29, a portion of the impact energy is absorbed by elastic deformation of the elastic body 62 and the volume of the impact noise is that much smaller.

In each of the aforementioned embodiments, an explanation has been given of the valve opening method of an exhaust gas recirculation control valve device where the shaft portion of the stepper motor is moved in the direction of the valve shaft (the so-called push down valve opening method) as a control valve device, but of course the invention is not limited to this example. For example, the invention can also be applied to the valve opening method of an exhaust gas recirculation control valve device where the shaft portion of the stepper motor and the valve shaft are engaged to each other and the shaft portion of the stepper motor is moved in the direction opposite to the valve shaft (the so-called pull up valve opening method). The invention can also be applied as a control valve device to, for instance, an idling speed control valve device, which adjusts the amount of air flowing into an internal combustion engine.

INDUSTRIAL APPLICABILITY

As explained above, in the control valve device according to claim 1 of the present invention, an elastic body is provided to absorb impact energy generated by the collision between the rotor positioning portions and the shaft portion positioning portions when the shaft portion is moved into the female thread portion to determine the initial position of the shaft portion, and so the impact noise generated by the collision between the rotor positioning portions and the shaft portion positioning portions can be reduced. Also, the force of impact imparted to the shaft portion positioning portions by the rotor positioning portions decreases, and so it is possible to prevent deformation of the rotor positioning portions and the shaft portion positioning portions.

In the control valve device according to claim 2 of the present invention, an elastic body is disposed between the shaft portion and the motor cap, and so impact noise propagated in the direction of the motor cap is absorbed by the elastic body and impact noise decreases further.

In the control valve device according to claim 3 of the present invention, an elastic body is integrated into the shaft bushing, and so the shaft bushing and elastic body can be handled as one unit and the number of assembly steps is reduced.

In the control valve device according to claim 4 of the present invention, an elastic body is disposed between the rotor positioning portion and the shaft portion positioning portion, and so much of the impact energy imparted to the shaft portion positioning portion by the rotor positioning portion is absorbed by elastic deformation of the elastic bodies, and so impact noise is decreases further.

In the control valve device according to claim 5 of the present invention, an elastic body is disposed between the shaft portion and the male thread portion, and so impact noise propagated in the direction of the male thread portion is absorbed by the elastic body and impact noise decreases further.

In the control valve device according to claim 6 of the present invention, an elastic body is disposed between the magnet portion and the female thread portion, and so impact noise propagated in the direction of the magnet portion is absorbed by the elastic body and impact noise decreases further.

In the control valve device according to claim 7 of the present invention, a coil spring is used as a pushing means, and so the construction is simple as well as inexpensive.

In the control valve device according to claim 8 of the present invention, an exhaust gas recirculation control valve is used as a valve main body, and so the impact noise generated by use of the exhaust gas recirculation control valve is small.

What is claimed is:

1. A control valve device comprising:
    a valve housing with an inflow passage and an outflow passage;
    a valve seat disposed between said inflow passage and said outflow passage;
    a valve for opening and closing said valve seat;
    a valve shaft, one end of which is fixed to said valve
    a pushing mechanism that pushes said valve against said valve seat; and
    a stepper motor for pushing said valve shaft in opposition to the pushing force of said pushing mechanism;
    wherein said stepper motor includes:
        a. a rotor having (1) a shaft portion with a shaft positioning portion, said shaft portion operative to push said valve shaft and also separatable therefrom, (2) a male thread portion connected to said shaft portion, (3) a shaft bushing supporting said shaft portion for movement only along a shaft axis direction, (4) a female thread portion screw coupled to said male thread portion which moves said male thread portion and said shaft portion along the shaft axis direction by rotating, (5) a magnet portion disposed around said female thread portion which rotates with said female thread portion, (6) a rotor positioning portion which is operative to collide with said shaft positioning portion to stop the rotation of said female thread portion and said magnet portion, and (7) an elastic body which absorbs impact energy released by the collision of said rotor positioning portion with said shaft positioning portion when said shaft portion moves into said female thread portion to determine an initial position of said shaft portion;
        b. a stator disposed around the outside of said rotor, which rotates said magnet portion and said female thread portion in steps via interaction of magnetic forces between said magnet portion and a field of north and south magnetic poles generated by passing a current through said stator; and
        c. a motor cap secured to said valve housing.

2. The control valve device according to claim 1, wherein said elastic body is disposed between said shaft bushing and said motor cap said motor cap, said motor cap surrounding said shaft portion.

3. The control valve device according to claim 1, wherein said elastic body is integrated into said shaft bushing.

4. The control valve device according to claim 1, wherein said elastic body is disposed between said rotor positioning portion and said shaft positioning portion.

5. The control valve device according to claim 1, wherein said elastic body is disposed between said shaft portion and said male thread portion.

6. The control valve device according to claim 1, wherein said elastic body is disposed between said magnet portion and said female thread portion.

7. The control valve device according to claim 1, wherein said pushing mechanism is a coil spring.

8. The control valve device according to claim 1, wherein said control valve device is an exhaust gas recirculation control valve.

\* \* \* \* \*